United States Patent [19]

Tesch

[11] Patent Number: 5,052,609
[45] Date of Patent: Oct. 1, 1991

[54] DEVICE FOR THE CENTERING AND CLAMPING OF PIPE WORKPIECES

[76] Inventor: Klaus Tesch, Dorotheenstrasse 93, D-2000 Hamburg 60, Fed. Rep. of Germany

[21] Appl. No.: 561,959

[22] Filed: Aug. 2, 1990

[30] Foreign Application Priority Data

Aug. 3, 1989 [DE] Fed. Rep. of Germany ....... 8909391

[51] Int. Cl.$^5$ ............................................ B23K 37/053
[52] U.S. Cl. .................................... 228/44.5; 228/49.3
[58] Field of Search ....................... 228/42, 44.5, 49.3; 219/59.1, 61.1

[56] References Cited

U.S. PATENT DOCUMENTS

| | | | |
|---|---|---|---|
| 3,095,844 | 7/1963 | Thielsch | 228/44.5 |
| 4,605,151 | 8/1986 | Brown | 228/44.5 |
| 4,867,368 | 9/1989 | Tesch | 228/49.3 |

Primary Examiner—Samuel M. Heinrich
Attorney, Agent, or Firm—Chilton, Alix & Van Kirk

[57] ABSTRACT

The device for the centering and clamping of pipe workpieces to be welded to another comprises clamping units which have clamping grooves opening outwards in a wedge-shaped manner and each containing a row of clamping members. Their groove walls are formed by annular parts which are movable axially relative to one another, are arranged releasably on a holding body and can be subjected to a force in the direction towards one another. The annular parts limiting a clamping groove are designed as elements separate from the annular parts limiting the other clamping grooves. The annular parts of each clamping unit are connected to one another movably in the axial direction, and there are hollow-cylindrical spacer pieces between the clamping units, one of which defines the welding region.

11 Claims, 2 Drawing Sheets

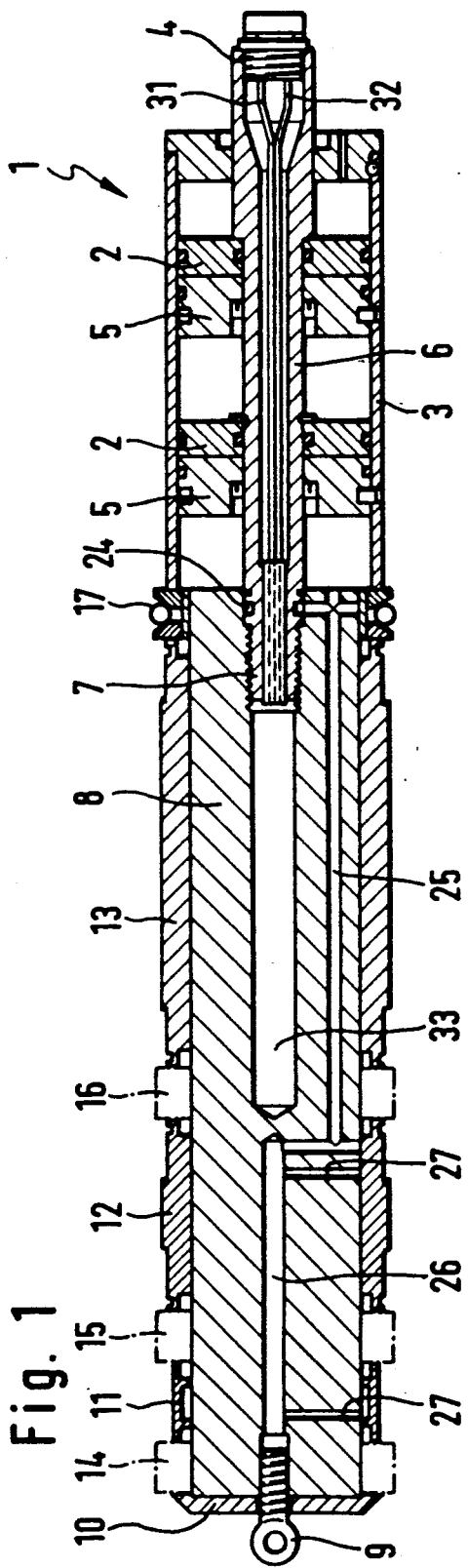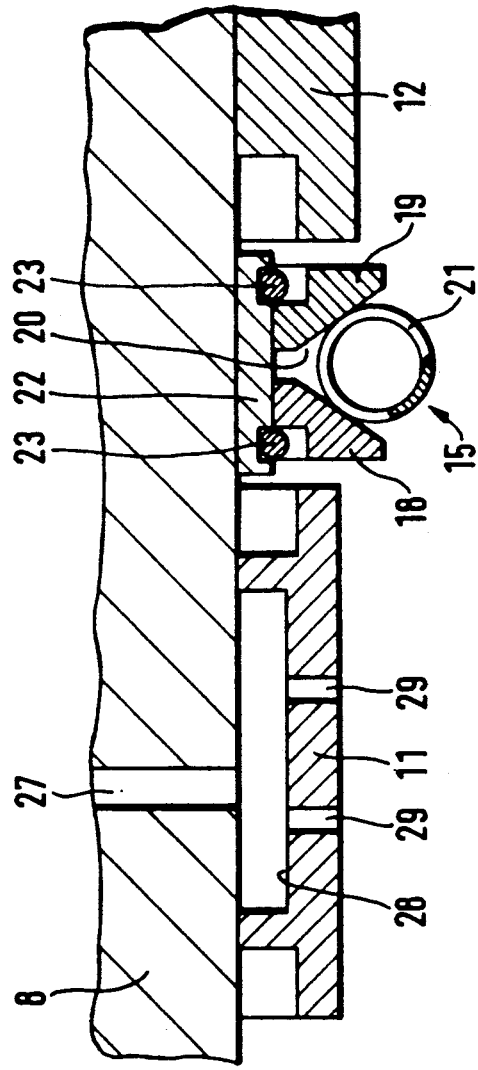

DEVICE FOR THE CENTERING AND CLAMPING OF PIPE WORKPIECES

The invention relates to a device for the centering and clamping of pipe workpieces to be welded to one another, which possesses, on both sides of a welding region equipped with an inert-gas supply, clamping units which have clamping grooves opening outwards in a wedge-shaped manner and each containing a row of clamping members, their groove walls being formed by annular parts which are movable axially relative to one another and are arranged releasably on a holding body and of which the outermost can be subjected to a force in the direction towards one another via a tension rod and a drive body.

The advantage of a known device of this type (EP-A-0,249,079) is that pipe workpieces can be centered and clamped very effectively with it, and this device can, by the change-over of its individual parts, be employed or converted for different uses (connection of a straight pipe piece to a curved pipe piece, connection of a straight pipe piece to a flange, connection of two straight pipe pieces). However, the disadvantage of this known device is that these devices can only ever be used for a very restricted diameter range. If pipes of many different diameters have to be welded together in the course of time, a very large number of corresponding devices also have to be kept ready. This not only requires a large amount of space, but also involves a very high financial outlay.

The object of the invention is to provide a device of the type mentioned in the introduction, which can be used for different pipe thicknesses at a low financial outlay and without taking up much space.

In the solution according to the invention, the annular parts limiting a clamping groove are designed as elements separate from the annular parts limiting the other clamping grooves, the annular parts of each clamping unit are connected to one another movably in the axial direction, and there are between the clamping units hollow-cylindrical spacer pieces of differing length, one of which defines the welding zone.

Whereas, in the known device, the annular parts or the regions (for example, the welding region) connected rigidly to them have large axial dimensions, in the device according to the invention the annular parts are designed as separate elements. The cylindrical spacer pieces occupying a large amount of space are independent of the annular parts and are not connected to these, so that the annular parts can easily be exchanged for other annular parts of suitable diameter, whereas the cylindrical spacer pieces between the annular parts and also the spacer piece carrying the welding region can be used for many different pipe diameters.

It would intrinsically be possible to use for each clamping unit two annular parts completely independent of one another, together with a row of clamping members. This results however in a large number of individual parts, and it is therefore more expedient to arrange the annular parts of each clamping groove slidably on a common sleeve, the row of clamping members then also at the same time being retained in this clamping unit.

If there are four clamping units, as in an advantageous embodiment, in this case there are not twelve individual parts (eight annular parts and four rows of clamping members), but only four composite clamping units.

So that the clamping units can easily be assembled together, the annular parts are expediently fastened to the sleeve by means of spring rings.

In an advantageous embodiment, the inert-gas supply is arranged in the holding body which has a plurality of radial outlet orifices, and the hollow cylinder defining the welding region has, in the middle region, an inside diameter which is larger than the outside diameter of the holding body, whereas the inside diameter in the end regions corresponds to the outside diameter of the holding body.

The cylindrical spacer body carrying the welding region therefore rests only in the vicinity of its end faces on the holding body, whilst in its middle region between the spacer piece and the holding body there is a cavity, in which the welding gas can penetrate from the holding body and can flow from there through bores in the spacer piece to the welding point. At the same time, the other bores of the holding body are covered by the spacer pieces which bear completely on the holding piece, so that no inert gas can flow out through outflow orifices of the holding body which are located here. Of course, these spacer pieces could also be designed in a similar way to the welding region, in which case the inert gas, although being capable of penetrating into the cavity between holding body and spacer piece, nevertheless could not flow out, since these spacer pieces have no bores leading outwards.

Expediently, the tension rod and/or the holding body is equipped with lines for a cooling medium, so that the clamping device does not become too hot during welding.

In an especially advantageous embodiment, the rows of clamping members are helical or coil springs which, again in a further advantageous embodiment, have different spring constants. A two-stage clamping operation thus becomes possible, in that under an initially lower force the clamping device is centered on a pipe piece by the drive body and only thereafter is the second pipe piece also centered under a higher drive force. This makes mutual alignment easier.

If the spacer pieces have different lengths, there are a greater number of possibilities for arranging the device.

The device can, at the same time, have a plurality of sets of clamping units with different outside diameters, of which the particular set corresponding to the correct pipe diameter can then be selected for the clamping and centering operation.

The clamping units will normally be concentric for centering purposes. But there can also be an additional slightly eccentric clamping unit. This can then be arranged as the outermost clamping unit when a pipe elbow curved as far as its end, without a straight end piece, is to be connected to a straight pipe piece.

The invention is described below by means of an advantageous embodiment, with reference to the accompanying drawings. In these:

FIG. 1 shows a general cross-sectional view of one embodiment;

FIG. 2 shows a detailed representation of the device of FIG. 1; and

Figure 3:
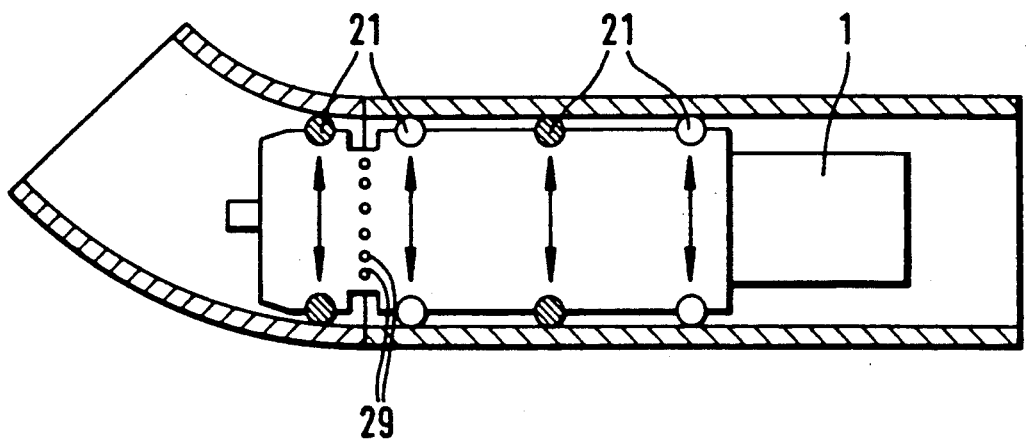
FIGS. 3 to 5 show the device of the invention in three different uses.

FIG. 1 shows the essentially cylindrical device which can be introduced into the pipe pieces to be clamped and centered. The drive body 1 has two pistons 2 which are arranged slidably within a cylinder 3. Two pistons 2 have the advantage over an intrinsically possible single piston that higher clamping forces are obtained for a predetermined pressure of the hydraulic fluid and for a predetermined outside diameter of the device. Via a fluidic connection 4 and a line (not shown), pressure medium can be fed to the chambers of the cylinder 3 between the fixed intermediate walls 5 and the pistons 4, so that the pistons 2 move to the right. During this movement, the pistons 2 pull outwards the piston rod or tension rod 6 which, at its inner end, is screwed by means of a screw connection 7 to a holding body 8, to which are fastened releasably, at its end remote from the cylinder 3, a pull eyelet 9, by means of which the device can be pulled into a pipe, and a headpiece 10. Parts described further below are arranged slidably in the axial direction on the cylindrical holding body 8. A pressure force acts on these parts on the one hand from the head piece 10 and on the other hand from the inner end face of the cylinder 3 when a pull is exerted by the tension rod 6.

The parts arranged between head piece 10 and inner end face of the cylinder 3 have hollow-cylindrical spacer pieces 11, 12 and 13. Between head piece 10 and spacer piece 11, between spacer piece 11 and spacer piece 12, between spacer piece 12 and spacer piece 13 and between the spacer piece 13 and inner end face of the cylinder 3 there is a respective clamping unit 14, 15, 16 and 17, of which the units 14, 15 and 16 are indicated merely diagrammatically in FIG. 1.

As shown more clearly in FIG. 2, these clamping units consist of two annular parts 18, 19 which enclose between them a groove 20 which opens in a wedge-shaped manner and into which is inserted an annular helical or coil spring 21. At the same time, the two annular parts 18 and 19 are located on a sleeve 22, on which they are retained by means of spring rings 23. The sleeve 22 is itself arranged slidably on the holding body 8. When the tension rod 6 exerts a force, the holding body 11 is pushed to the right in FIG. 2 and the holding body 12 to the left, so that the two annular parts 18, 19 are pressed together, with the result that the helical or coil spring 21 is pressed outwards and is thereby laid against the pipe and centers and clamps this.

The sleeve 22 will normally have a hollow-cylindrical form. But there can also be a clamping unit (expediently as a fifth clamping unit), in which the inner bore of the sleeve 22 is eccentric relative to the outer cylindrical surface of the sleeve 22. This clamping unit can then be arranged as the outermost when a pipe elbow curved as far as its end, without a straight end piece, is to be connected to a straight pipe piece.

The inert-gas supply takes place by means of the fluidic connection 4 and a line (not shown) in the tension rod 6 to a circumferential groove 24 of the tension rod 6, from there via bores 25 in the holding body 8 to an inner cavity 26 of the latter and from there outwards through radial bores 27. At the same time, the locations of these radial bores 27 are selected so that a particular bore 27 is in the region of the spacer piece 11, carrying the welding region, whilst the other bore 27 or other bores are covered by the spacer pieces 12, 13, specifically in all the possible positions in which the spacer pieces 11, 12 and 13 can be arranged. The cooling water is supplied and taken off via the connection 4 and lines 31, 32 in an inner cavity 33 of the holding body 8.

The spacer piece 11 carrying the welding region has, in the middle part, a region 28 of larger inside diameter, into which inert gas can flow and can then subsequently flow out of the 29 of this spacer piece. As is evident from the figures, the spacer piece 11 carrying the welding region has a somewhat smaller outside diameter than the remaining spacer pieces.

Figure 4:
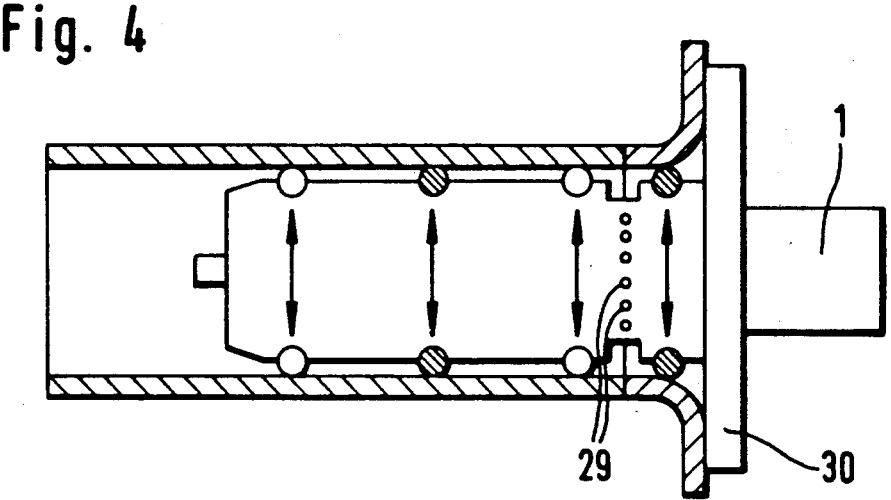
Figure 5:
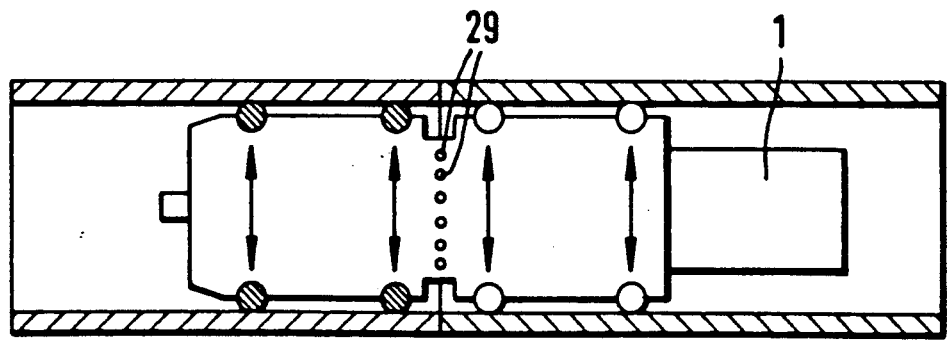

By a change-over, the welding region or the spacer piece 11 can be arranged either on the side remote from the drive body or the side near the drive body or else in a middle position as shown in FIGS. 3 to 5. Either the screw connection 7 must previously be released or the head piece 10 removed. FIGS. 3 to 5 show that the spacer piece 11 with the welding orifices 29 is arranged differently according to the particular welding desired. In the position of FIG. 3, a straight pipe piece is to be connected to a curved pipe piece. In the arrangement of FIG. 4, a straight pipe piece is to be connected to a flange, for which purpose a stop flange 30 is also fastened to the device. Finally, in the embodiment of FIG. 5, two straight pipe pieces are to be connected to one another.

In FIGS. 3 to 5, the two different strengths of the helical springs 21 are also indicated by hatching, the hatched helical springs 21 being the stronger helical springs. At the same time, in the arrangement of FIG. 3, the mode of operation is such that, under an initially low tension exerted by the tension rod 6, the two weaker helical springs (shown without hatching) center the device in the straight pipe piece. The curved pipe piece can then subsequently be attached and is then centered by the stronger helical springs only when the tension is increased. A similar behaviour occurs in the arrangements of FIGS. 4 and 5.

I claim

1. A device for the centering and clamping of pipe workpieces to be welded to one another, comprising:

a generally cylindrical holding body;

a welding region on the body, equipped with an inert-gas supply;

a plurality of generally annular clamping units carried on the body, at least one clamping unit positioned on each axial side of the welding region and each unit having a clamping groove opening radially outwards in a wedge-shaped manner, containing a clamping member, each groove having walls formed by annular parts which are movable axially relative to one another and are arranged releaseably on the holding body, wherein the annular parts (18, 19) defining one clamping groove (20) are separate from the annular parts (18, 19) defining the other clamping grooves (20), an annular part (18, 19) of each clamping unit (15) is connected movably in the axial direction to an annular part of an adjacent clamping unit by a hollow-cylindrical spacer piece (11, 12, 13), one (11) hollow-cylindrical spacer piece defining the welding region; and means carried by the body for drawing the spacer pieces toward each other axially so as to bear upon the clamping units, thereby urging the clamping members radially outward into clamping engagement with the workpieces.

2. The device as claimed in claim 1, wherein the annular parts (18, 19) of each clamping groove (20) are arranged slidably on a common sleeve (22).

3. The device as claimed in claim 2, wherein the annular parts (18, 19) are fastened to the sleeve (22) by means of spring rings (23).

4. The device as claimed in claim 1, wherein the inert-gas supply is arranged in the holding body (8) which has a plurality of radial outlet orifices (27), and wherein the hollow cylinder cylinder (11) defining the welding region has an inside diameter which is larger than the outside diameter of the holding body (8), whereas the inside diameter of the other spacer pieces corresponds to the outside diameter of the holding body (8).

5. The device as claimed in claim 1, wherein the means for drawing the spacer pieces include a tension rod axially disposed in the holding body, and at least one of the tension rod (6) and the holding body (8) is equipped with lines for a cooling medium.

6. The device as claimed in claim 1, wherein the clamping members are helical springs (21).

7. The device as claimed in claim 6, wherein the are helical springs (21) with different spring constants.

8. The device as claimed in claim 1, wherein there are four clamping units (14–17).

9. The device as claimed in claim 1, wherein the spacer pieces (11, 12, 13) have different lengths.

10. The device as claimed in claim 1, wherein there is a plurality of sets of clamping units (14–17) with different outside diameters.

11. The device as claimed in claim 1, wherein there is an eccentric clamping unit (14–17).

* * * * *